M. ATWOOD.
Corn Planter.

No. 80,585. Patented Aug. 4, 1868.

Witnesses:

Inventor:
Moses Atwood
per Munn & Co
Attys

United States Patent Office.

MOSES ATWOOD, OF NEW SHARON, IOWA.

Letters Patent No. 80,585, dated August 4, 1868.

IMPROVEMENT IN SEED-PLANTER.

*The Schedule referred to in these Letters Patent and making part of the same.*

TO ALL WHOM IT MAY CONCERN:

Be it known that I, MOSES ATWOOD, of New Sharon, in the county of Mahaska, and State of Iowa, have invented a new and improved Seed-Planter; and I do hereby declare that the following is a full, clear, and exact description thereof, which will enable those skilled in the art to make and use the same, reference being had to the accompanying drawings, forming part of this specification.

This invention relates to a new and improved machine for planting corn and other seed designed to be dropped in check-rows, and it consists in a novel construction and arrangement of parts, as hereinafter fully shown and described, whereby the seed may be dropped or planted perfectly even or in hills at a uniform distance from each other, and the working parts readily operated by the driver.

In the accompanying sheet of drawings—

Figure 1:
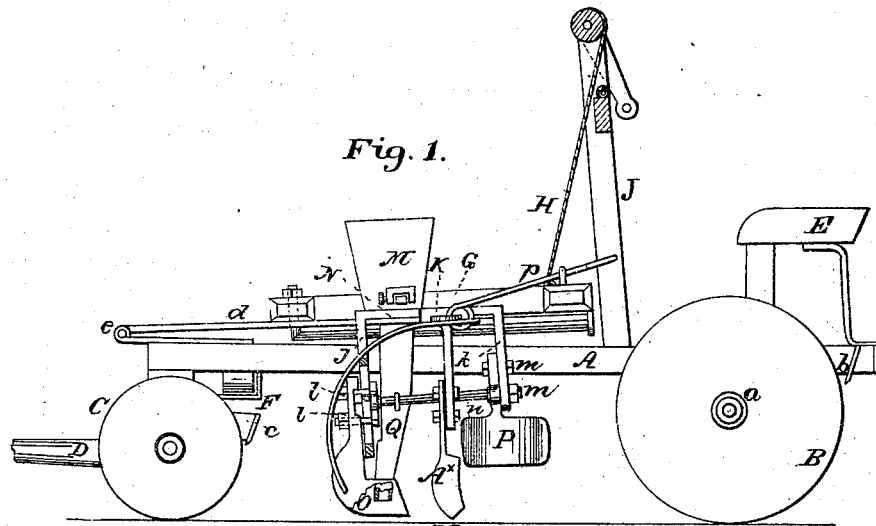

Figure 1 is a side view of my invention, partly in section.

Figure 2:
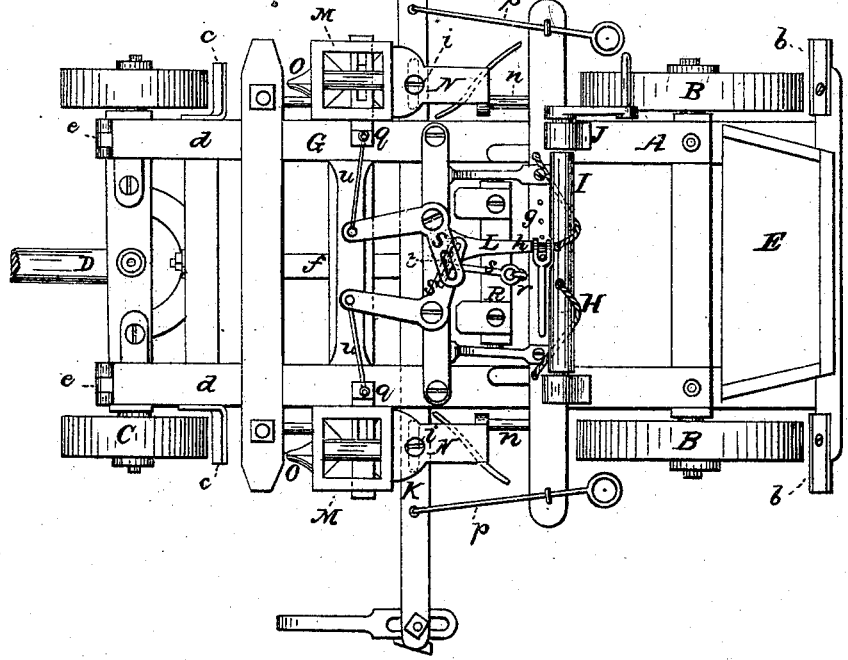

Figure 2, a plan or top view of the same.

Similar letters of reference indicate corresponding parts.

A represents a rectangular frame, the rear end of which is supported by two wheels, B B, on a fixed axle, $a$, and the front part supported by a two-wheel truck, C, arranged to turn on a king-bolt, and having a draught-pole, D, attached.

This arrangement is precisely like that of an ordinary four-wheel vehicle, and admits of the machine being readily turned.

E is the driver's seat, on the rear part of the frame A, and $b\ b$ are scrapers attached to projecting ends of the rear cross-bar of the frame A, in line with the wheels B B, for the purpose of keeping the periphery of said wheels clean or free from mud or earth.

Similar scrapers, $c\ c$, are attached to the ends of a bar, F, which is secured to the truck C, said scrapers keeping the front wheels clean.

G is a rectangular frame, provided with projecting bars, $d\ d$, at its front end, one on each side, said bars being attached by hinges, $e\ e$, to the front end of the frame A.

The rear end of this frame is connected by a cord or chain, H, with a windlass, I, fitted in the upper part of an upright support, J, on frame A, directly in front of the driver's seat E.

The seed-dropping device is attached to this frame, G, and by raising the rear part of the same, through the medium of the windlass I, the furrow and covering-shares may be elevated above the surface of the ground.

This adjustment of the frame G is necessary when the device is to be turned at the ends of rows, or drawn from place to place.

K is an iron bar, which extends underneath the frame G, projects beyond each side of it, and is pivoted at its centre to a bar, $f$, which is secured to the under side of the frame G.

The bar K has an arm, L, extending back from it, and this arm projects over the rear bar $g$ of the frame G, and has a catch or fastening, $h$, attached, by which the bar K is secured in position, and prevented from moving or shifting.

M M are two seed-boxes, which are attached to bars, N N, placed transversely on the bar K, and connected to it by bolts, $i$, which pass through oblong slots in bar K.

These bars N have each two slotted pendants, $j\ k$, attached, one at the front and the other at the rear, a furrow-share, O, being attached to each front pendant by bolts $l$, and a covering-share, P, attached to each rear pendant by bolts $m$.

These shares may be adjusted higher or lower, as desired.

The pendants $j\ k$ have holes made through them, through which guide-rods, $n$, attached to the frame G, one at each side, pass, and each seed-box has a spout, Q, attached, which conducts the grain down to the furrows made by the shares O.

By loosening the catch or fastening $h$, the bar K may be adjusted more or less angularly, as occasion requires, rods p being attached to said bar, which rods extend back to within convenient reach of the driver on seat E.

This arrangement puts the device under the complete control of the driver or operator, and enables him to plant the seed evenly in check-rows.

The bar K has markers, A×, attached to its ends.

The seed-distributing device is composed of reciprocating plates, g g, which work in the lower parts of the seed-boxes, and are operated by a treadle-shaft, R.

This treadle-shaft is provided with an upright arm, r, the upper end of which is connected by a rod, s, with bent levers S S, on the frame G, the front end of rod s being bent upward, and fitting in oblong slots, t, in the rear arms of the levers S, while the outer ends of the front arms of said levers are connected, by rods u, to the seed-plates q q.

I claim as new, and desire to secure by Letters Patent—

1. The attaching of the seed-distributing apparatus to a frame, G, placed on the frame A of the machine, and attached thereto by hinges, and arranged in connection with a windlass, in the manner substantially as shown, to admit of the furrow and covering-shares being raised when necessary, as set forth.

2. Operating the seed-distributing plates q q, through the media of the treadle-shaft R and bent levers S S, arranged substantially as set forth.

3. The adjustable bar K, arranged as shown in connection with the bars N N, on which the seed-boxes M M are secured, for the purpose specified.

4. The combination of the frame G with the frame A, provided with truck-wheels, when said frames are used in connection with a seed-dropping mechanism, as set forth.

MOSES ATWOOD.

Witnesses:
  JARED ROCKWELL,
  D. R. MOORE.